(12) United States Patent
Bareis et al.

(10) Patent No.: US 9,739,241 B2
(45) Date of Patent: Aug. 22, 2017

(54) VALVE FOR AN EXHAUST GAS LINE OF AN INTERNAL COMBUSTION ENGINE

(71) Applicant: BorgWarner Esslingen GmbH, Esslingen am Neckar (DE)

(72) Inventors: Bernd Bareis, Täferrot-Utzstetten (DE); Julian Haselmaier, Bempflingen (DE); Patrick Wilde, Weilheim/Teck (DE)

(73) Assignee: BorgWarner Esslingen GmbH, Esslingen am Neckar (DE)

( * ) Notice: Subject to any disclaimer, the term of this patent is extended or adjusted under 35 U.S.C. 154(b) by 0 days.

(21) Appl. No.: 15/076,095

(22) Filed: Mar. 21, 2016

(65) Prior Publication Data
US 2016/0281654 A1   Sep. 29, 2016

(30) Foreign Application Priority Data

Mar. 23, 2015   (DE) .......................... 10 2015 104 287

(51) Int. Cl.
*F16K 1/22*   (2006.01)
*F02M 26/70*   (2016.01)
(Continued)

(52) U.S. Cl.
CPC ............. *F02M 26/70* (2016.02); *F16K 1/221* (2013.01); *F16K 1/222* (2013.01); *F16K 1/2263* (2013.01);
(Continued)

(58) Field of Classification Search
CPC ........ F02M 26/70; F02M 26/54; F02M 26/72; F16K 1/2263; F16K 31/041; F16K 1/222; F16K 27/0218; F16K 1/221
(Continued)

(56) References Cited

U.S. PATENT DOCUMENTS 3,384,340 A * 5/1968 Fawkes ..................... F16K 1/22
                                                    251/308
4,604,254 A * 8/1986 Yamamoto ............ F16K 1/2261
                                                    251/308
(Continued)

FOREIGN PATENT DOCUMENTS

DE   10 2006 060 876 A1   6/2008
DE   10 2007 055 422 A1   5/2009
(Continued)

*Primary Examiner* — John Bastianelli
(74) *Attorney, Agent, or Firm* — Bose McKinney & Evans LLP (57) ABSTRACT

A valve for an exhaust gas line of an internal combustion engine in which a closure body is arranged in a duct and is positioned in a recess of a shaft, the closure body being pivotable about a rotation axis of the shaft. The closure body has two sides and a circumferential surface arranged between the two sides. The circumferential surface has sections with different external dimensions. A first external dimension of the circumferential surface of the closure body in a first section is smaller than the smallest internal dimension between end regions of the recess of the shaft in which the closure body sits. A second external dimension of the circumferential surface in a second section is greater than the smallest internal dimension of the recess of the shaft. The circumferential surface contacts the shaft in each of the two end regions of the recess.

10 Claims, 8 Drawing Sheets

(51) Int. Cl.
    *F16K 1/226*     (2006.01)
    *F16K 27/02*     (2006.01)
    *F16K 31/04*     (2006.01)
    *F02M 26/72*     (2016.01)
    *F02M 26/54*     (2016.01)
(52) U.S. Cl.
    CPC ........ *F16K 27/0218* (2013.01); *F16K 31/041* (2013.01); *F02M 26/54* (2016.02); *F02M 26/72* (2016.02)
(58) Field of Classification Search
    USPC .................................. 123/337; 251/305–308
    See application file for complete search history.

(56) References Cited

U.S. PATENT DOCUMENTS

| | | | |
|---|---|---|---|
| 6,554,250 B2 * | 4/2003 | Alves | F16K 27/0218 123/337 |
| 7,392,826 B2 * | 7/2008 | Schub | F02D 9/1015 123/337 |
| 2008/0149185 A1 | 6/2008 | Walter et al. | |
| 2012/0061603 A1 * | 3/2012 | Kurihara | F16K 1/222 251/305 |
| 2013/0167815 A1 * | 7/2013 | Bareis | F02M 25/0773 123/568.24 |
| 2013/0299728 A1 | 11/2013 | Yokoyama et al. | |
| 2014/0117267 A1 | 5/2014 | Gerards et al. | |

FOREIGN PATENT DOCUMENTS

| | | |
|---|---|---|
| DE | 10 2011 106 744 B3 | 12/2012 |
| DE | 11 2011 105 111 T5 | 1/2014 |

\* cited by examiner

VALVE FOR AN EXHAUST GAS LINE OF AN INTERNAL COMBUSTION ENGINE

RELATED APPLICATIONS

This application claims priority to DE 10 2015 104 287.8, filed Mar. 23, 2015, the entire disclosure of which is hereby incorporated herein by reference in its entirety.

BACKGROUND

The invention relates to a valve for an exhaust gas line of an internal combustion engine. Low pressure flap valves are known from DE 10 2007 055 422 A1 and are used particularly for controlling the exhaust gas return in internal combustion engines in motor vehicles. The closure body of the valve is a flap which is fastened in a torque-proof manner on a shaft and is pivoted by an electromagnetic actuating drive connected directly to the shaft. By pivoting the flap, the mass flow of the returned exhaust gas can be controlled. Such flap valves have, with a relatively small overall size, a relatively large free cross-section and thereby enable a high mass throughput with a small pressure drop. They are therefore preferably used when exhaust gas is taken from the low pressure exhaust gas line.

An exhaust gas return is used in order to reduce the emissions of the internal combustion engine, in particular nitrogen oxides and other pollutants. The legal emission requirements for internal combustion engines, in particular for those in motor vehicles, have already increased greatly in recent years, especially in Europe and North America, and will be further tightened considerably in the future.

SUMMARY

This disclosure teaches an improved valve of the type named in the introduction, by which internal combustion engines achieve reduced emissions.

The valve according to this disclosure is a low pressure valve and can be used as an exhaust gas return valve in the exhaust gas return. The valve has a housing with an inlet opening and an outlet opening and with a duct for the directing of exhaust gases from the inlet opening to the outlet opening. The inlet opening can be connected with a low pressure exhaust gas line of the internal combustion engine. The exhaust gas temperatures prevailing there are substantially lower than in the high pressure exhaust gas line and lie at approximately 160° C. to 180° C. The outlet opening of the valve can be connected with a fresh air duct, which feeds to the internal combustion engine the fresh air necessary for the combustion, in particular in a region downstream the fresh air has passed through an air filter and upstream the fresh air enters into a compressor.

A closure body is arranged in the duct, which closure body sits in a recess of a shaft, and in particular consists of metal. The closure body can form a flap. The closure body can be formed by a plate, in particular by a sheet metal plate. The recess in the shaft can have at least one slot passing radially through the shaft, in which the closure body is placed. The closure body is pivotable about the rotation axis of the shaft and has a closed position, in which it separates an upstream section of the duct from a downstream section of the duct. The valve according to this disclosure is therefore in particular a flap valve. The valve is used for controlling an exhaust gas mass flow, which is returned to the internal combustion engine.

The valve can have an electromagnetic actuating drive connected with the shaft, which can sit directly on the shaft as a direct drive. The electromagnetic actuating drive can contain a magnet rotor which is connected to the shaft in a torque-proof manner. It can also contain a coil body penetrated by the shaft. On the end of the shaft facing away from the closure body a sensor element can be arranged in order to measure the current pivoting angle of the closure body. The shaft can preferably be mounted rotatably in the housing on only one side of the closure body. The mounting preferably contains a ball bearing arranged between the closure body and the magnet rotor, which ball bearing is arranged in particular close to the magnet rotor, in order to be able to reliably receive the high magnetic forces.

The closure body has two sides, of which a first side in the closed position of the closure body faces the upstream section of the duct and of which a second side in the closed position of the closure body faces the downstream section of the duct. The closure body has a circumferential surface which is arranged between the two sides of the closure body. The circumferential surface of the closure body can—in a transverse view transversely to the rotation axis of the shaft onto one of the sides of the closure body—form an outer contour of the closure body designated below also as "closure body contour." The closure body contour can be circular or elliptical in shape. The circumferential surface of the closure body extends through the recess in the shaft or respectively through the slot in the shaft.

The circumferential surface of the closure body has sections with different external dimensions. A first external dimension of the circumferential surface of the closure body in a first section is smaller than the smallest internal dimension between the end regions of the recess of the shaft in which the closure body sits. Here, all the said dimensions, i.e. all external dimensions of the circumferential surface of the closure body and the internal dimensions of the recess in the shaft are measured parallel to one another along the rotation axis of the shaft. A second external dimension of the circumferential surface of the closure body in a second section is greater than the smallest internal dimension of the recess in the shaft. The circumferential surface of the closure body contacts the shaft in each of the two end regions of the recess. On a displacement of the closure body in the recess of the shaft in a direction oriented parallel to the extent plane of the closure body and transversely to the rotation axis of the shaft, its displacement is delimited by a striking of its circumferential surface against the shaft.

The valve according to this disclosure may have substantial advantages (but which are not necessary):

With a valve according to this disclosure, the amount of the exhaust gas which is returned to the internal combustion engine can be controlled precisely, so that neither too much nor too little exhaust gas is returned. An exhaust gas return serves per se to reduce nitrogen oxides and other pollutants. If, however, the mass flow of the exhaust gas which is returned to the internal combustion engine is too high, increased soot formation, higher fuel consumption and lower performance of the internal combustion can occur. An increased soot formation leads to the soot filter present in modern diesel engines becoming clogged more quickly. An increased fuel consumption increases the carbon dioxide emissions in an undesirable manner.

With the valve according to this disclosure, a very precise control of the mass flow of the returned exhaust gas can be achieved. In particular in the case of an internal combustion engine running under high load, the mass flow of the exhaust gas returned to the internal combustion engine can be reduced in a defined way in a necessary manner for modern engines, such that, in particular also at full load, no more than the desired amount of exhaust gas is returned. Hereby, the emissions of the internal combustion engine, in particular at full load, can be reduced, because too high an amount of returned exhaust gas does not enable an optimum combustion here.

Maintaining the principle of a flap valve, which is favorable with regard to fluid engineering, the leakage mass flow of the exhaust gas, which despite a closure body pivoted in closed position can still arrive from the inlet opening to the outlet opening of the valve, can be very greatly reduced in the valve according to this disclosure. In particular, a leakage path running radially through the shaft is closed, which runs through the recess in the shaft along the circumferential surface of the closure body and can be seen in the enlarged illustration of FIG. 2 of DE 10 2007 055 422 A1.

In modern engines, additional catalysts and arrangements for exhaust gas treatment, for example with the addition of ammonia, are arranged in the low pressure exhaust gas line. These catalysts and arrangements are arranged in the exhaust gas line downstream the connection point of the inlet opening of the valve according to this disclosure. The catalysts and arrangements for exhaust gas treatment increase the flow resistance in the exhaust gas line, so that the pressure present at the inlet opening of the valve increases. In these cases, a valve according to this disclosure is also still very well able to control the exhaust gas mass flow precisely and, at the same time, to ensure the required small leakage mass flow with a closure body situated in the closed position.

In one embodiment, the contact between the circumferential surface of the closure body and the shaft can be formed by a linear contact. The linear contact can lie within the recess of the shaft and in particular can run in a straight line. Hereby, the sealing is further improved.

In a further embodiment, the circumferential surface of the closure body—viewed in the transverse view transversely to the rotation axis of the shaft onto one of the sides of the closure body—can have at least one stop shoulder, which in one of the two end regions of the recess lies against the shaft. The viewing direction in the transverse view runs perpendicularly to the extent plane of the closure body, which runs between the two sides of the closure body, in particular parallel thereto. Alternatively to the transverse view, a sectional view through the shaft and the closure body, the section plane of which runs parallel to the rotation axis of the shaft between the two sides of the closure body, can also be suitable. In the case of only one stop shoulder, the closure body lies with a shoulder-free section at the other end region of the recess against the shaft. The circumferential surface of the closure body can have two stop shoulders, each of which lies in one of the two end regions of the recess against the shaft. The closure body contour containing at least one stop shoulder brings about a good sealing.

In a further embodiment, the circumferential surface of the closure body between the first section of the closure body and the second section of the closure body—viewed in the transverse view transversely to the rotation axis of the shaft onto one of the sides of the closure body—, in particular in the region of the stop shoulder, can define a tangent running in the extent plane of the closure body. The circumferential surface of the closure body, in particular the stop shoulder, can also contain a straight line section in the transverse view. In particular, a straight line section or a tangent can be situated at each of the stop shoulders. The tangent or the straight line section has an angle of a maximum of 45°, in particular of a maximum of 30°, to the rotation axis of the shaft. Hereby, a relatively steep transition is ensured from the first section of the circumferential surface of the closure body, the external dimension of which is smaller than the smallest internal dimension of the recess of the shaft, and the second section of the circumferential surface of the closure body, the external dimension of which is greater than the smallest internal dimension of the recess of the shaft, so that the closure body, on insertion transversely to the rotation axis of the shaft into the recess in the shaft strikes in a precisely predefined position against the shaft and seals the recess in the shaft.

The first external dimension of the circumferential surface of the closure body, which is smaller than the smallest internal dimension of the recess of the shaft, is necessary so that the closure body can be pushed into the recess of the shaft during mounting. To ensure a simple mounting, the difference of the first external dimension from the smallest internal dimension of the recess can be from 0.03 mm to 0.4 mm, in particular approximately 0.05 mm. The second external dimension of the circumferential surface of the closure body in the second section can be a few tenths of a millimeter greater than the smallest internal dimension of the shaft. The second external dimension can be selected, in particular, to be so great that the closure body does not tilt or jam in the recess in the shaft.

An abutment of the circumferential surface of the closure body against the shaft in each of the two end regions of the recess should be guaranteed despite the play of the closure body in the recess. The difference of the second external dimension of the circumferential surface of the closure body from its first external dimension can be 0.2 mm to 2 mm, in particular 0.6 mm to 1 mm, in particular when the closure body contour has two stop shoulders. For one stop shoulder, the difference of the second external dimension of the circumferential surface of the closure body from its first external dimension can be 0.3 mm to 0.5 mm.

In a further embodiment, two elongated projections can be arranged on the inner wall of the duct in the region of the closure body, which projections project into the duct and extend by their longitudinal direction in circumferential direction of the duct. One of the projections can be situated in the upstream section of the duct and the other projection can be situated in the downstream section of the duct. The projections can therefore be situated on opposite sides of the closure body. Each of the projections can have a valve seat pointing in longitudinal direction of the duct, wherein the two valve seats point in opposite directions. The closure body can have two sealing surfaces, each of which, in the closed position of the closure body, lies against one of the valve seats and by pivoting of the closure body is able to be raised from its closed position from the respective valve seat. The sealing surfaces are arranged on opposite sides of the closure body.

The valve can contain a seal made of a polymer, which is arranged on the valve seats. The seal is elastic and preferably consists of an elastomer, preferably of a fluororubber (FKM), which is preferably peroxidically cross-linked. The seal is temperature-resistant, preferably up to 200° C., and resistant with respect to the aggressive substances present in the exhaust gas. The seal is fastened to the projection belonging to the respective valve seat, and in the closed position of the closure body is contacted in a sealing manner by the associated sealing surface of the closure body. In each of the end regions of the recess in the shaft, the shaft has a circular-cylindrical circumferential surface, which is arranged coaxially to the rotation axis of the shaft. The seal can extend in circumferential direction of the shaft and lies in a sealing manner at least against the region of each of the circular-cylindrical circumferential surfaces of the shaft facing the upstream section of the duct. Such a seal, in combination with a sealing according to this disclosure of the circumferential surface of the closure body with respect to the recess in the shaft enables a particularly intensive reduction of the leakage mass flow through the valve.

The seal is in particular constructed in one piece, but can also be formed from several sections separate from one another, which lie against one another in a sealing manner. In particular, the seal surrounds the entire circumference of the shaft, and lies in a sealing manner along its entire circumference. This has the advantage that the seal also seals the passage in the wall of the duct, through which the shaft extends to its bearing and the actuating drive. A separate bearing seal can thereby be dispensed with. It is advantageous if the seal is fastened to the wall of the duct in its section lying against the circular-cylindrical circumferential surface of the shaft and on pivoting of the closure body slides over the shaft. This may have the advantages in that the cross-section of the shaft is not weakened by an annular groove, that the shaft is able to be produced more simply and that the seal does not move in the housing on pivoting of the closure body.

The seal prevents a direct contact between the closure body and the housing. This reduces corrosion on the closure body and/or on the housing brought about by the exhaust gases, when the housing and/or the closure body consist of metal, in particular aluminium. Even if a corrosive attack were to take place on a sealing surface of the closure body and unevennesses were to arise there, the seal, owing to its elasticity, can balance out these unevennesses and thereby prevent the leakage from increasing.

In a further embodiment, the seal has, in a section which lies between its section lying against the shaft and a section fastened to one of the projections, a sealing lip extending in axial direction of the circular-cylindrical circumferential surface, which sealing lip lies in a sealing manner against the circular-cylindrical circumferential surface of the shaft and slides over the shaft on pivoting of the closure body. Hereby, the leakage path running in circumferential direction around the shaft may be sealed particularly well and a particularly low leakage mass flow may be achieved. Through the sealing lip, therefore, a very good sealing of the closure body in its closed position may be achieved. Particularly, between the sealing lip and the circular-cylindrical circumferential surface of the shaft only a linear contact takes place, which is oriented parallel to the rotation axis of the shaft. Thereby, only a small friction occurs on the contact line, which guarantees a long lifespan of the seal and low hysteresis losses. Fluctuations of current in the actuating drive, which can occur on approaching a particular pivoting angle of the closure body depending on whether this pivoting angle is approached from the opened position or from the closed position of the closure body, are designated as "hysteresis losses." When the hysteresis losses are small, the control of the actuating drive is simplified.

The housing of the valve can consist of a temperature-resistant fibre-reinforced, for example glass-fibre-reinforced, thermoplast, in particular of a glass-fibre-reinforced PA 6 or PPA. Hereby, the weight of the housing can be reduced and thereby the fuel consumption of the internal combustion engine arranged in a motor vehicle can be reduced. In addition, the corrosion resistance of the valve is further increased.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
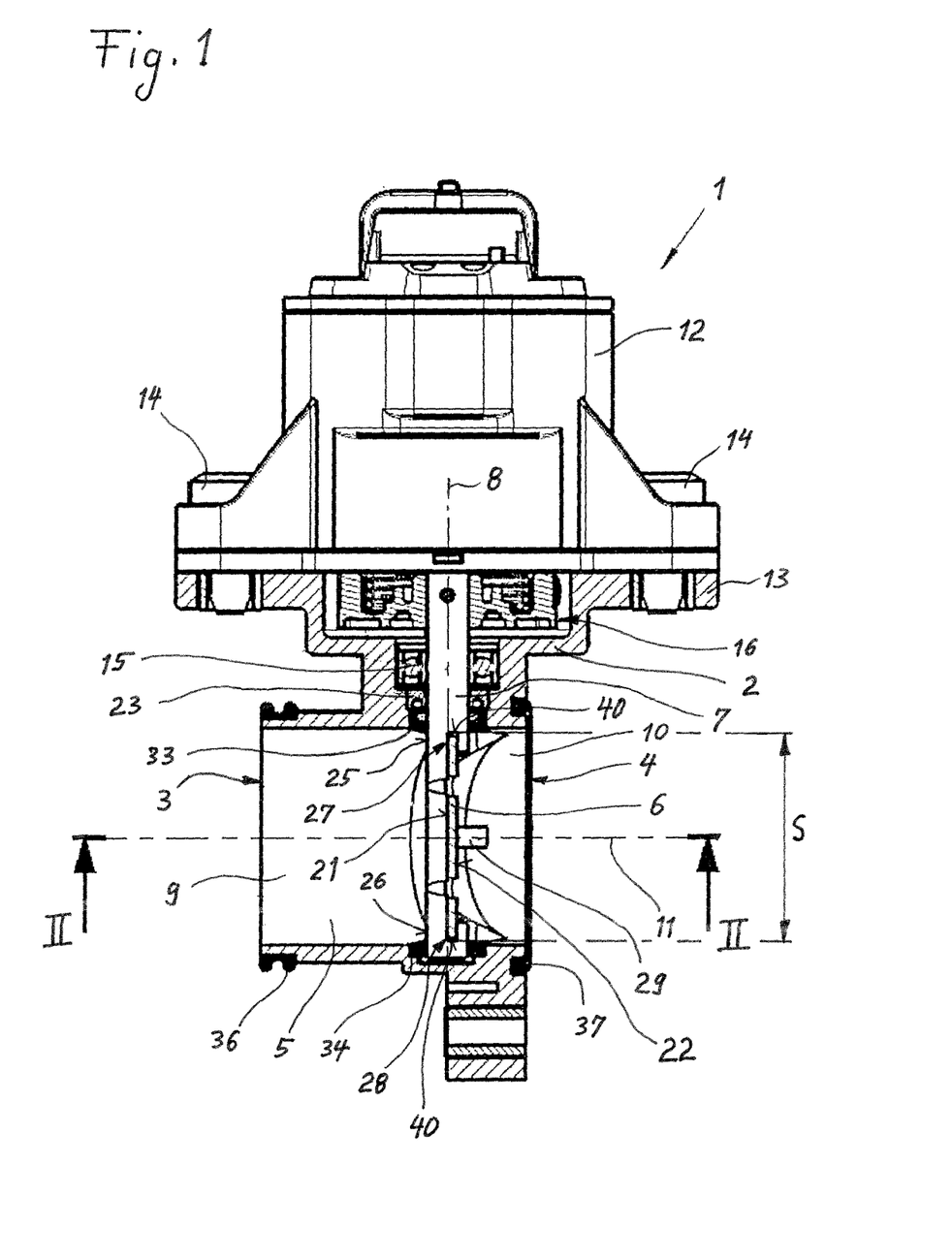
FIG. 1 is a sectional view through a valve according to this disclosure.
Figure 2:
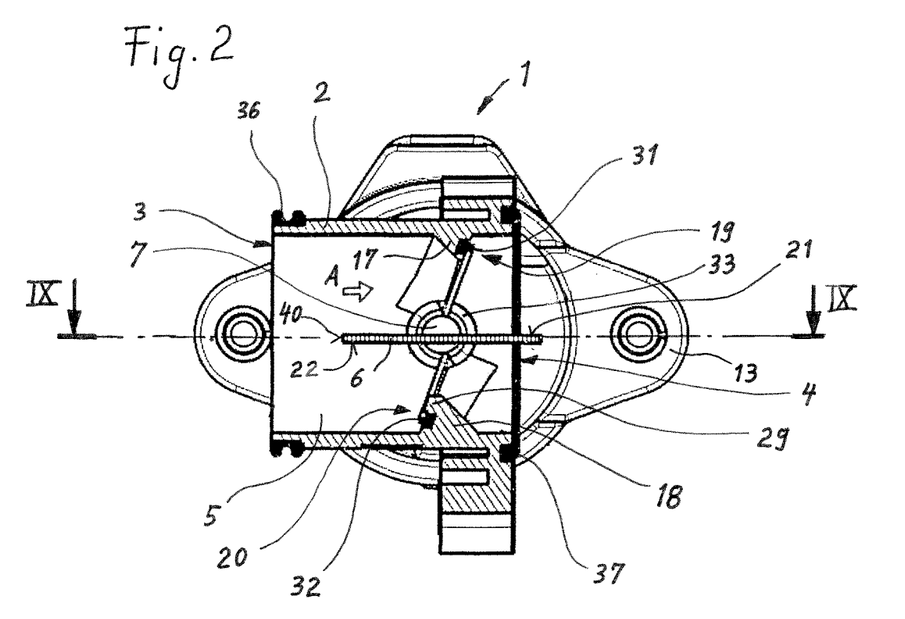
FIG. 2 is a sectional view along the section plane II-II of FIG. 1 through the valve.

Valves 1 for an exhaust gas line of an internal combustion engine according to FIGS. 1 and 2 as well as 6 and 7 have a housing 2 with an inlet opening 3 and an outlet opening 4. The housing 2 contains a duct 5 for the directing of exhaust gases from the inlet opening 3 to the outlet opening 4. In the duct 5 a closure body 6 is arranged, which is constructed as a plate and acts as a flap. The closure body 6 sits in a torque-proof manner in a recess in a shaft 7 and is pivotable about the rotation axis 8 of the shaft. The closure body has a closed position, in which it separates an upstream section 9 of the duct 5 from a downstream section 10 of the duct 5.

Figure 5:
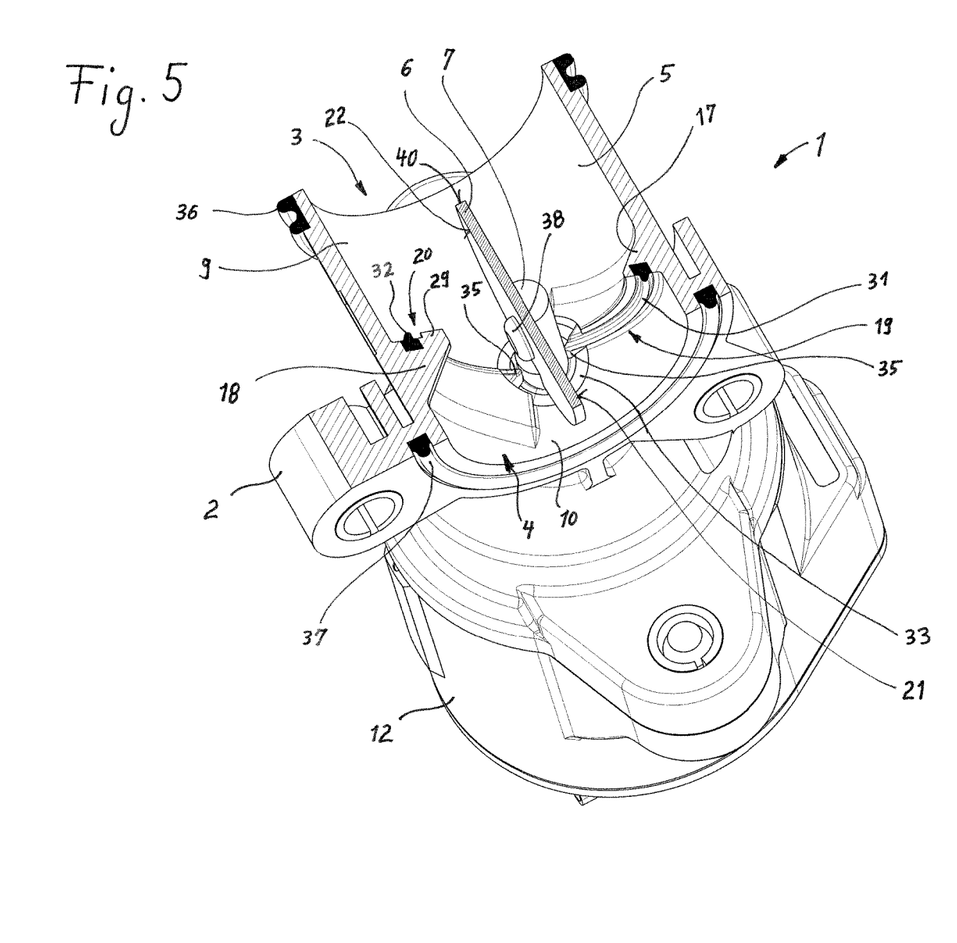
FIG. 5 is a perspective view of a valve cut along the section plane II-II of FIG. 1.

In FIGS. 2 and 5, the closure body 6 is illustrated in opened position. Exhaust gases from a low pressure exhaust gas line of a motor vehicle, which is not illustrated, which is connected with the inlet opening 3 in a manner which is not illustrated, can flow through the duct 5 in flow direction A and via the outlet opening 4, which is connected with a fresh air duct of the motor vehicle in a manner which is not illustrated, can be returned to the internal combustion engine of the motor vehicle again. In its position illustrated in FIG. 2, the closure body 6 is opened to a maximum extent. The closure body 6 is parallel here to the longitudinal direction 11 of the duct 5. The duct 5 has a circular cross-section. The closure body 6 has a circular or elliptical outer contour.

Figure 6:
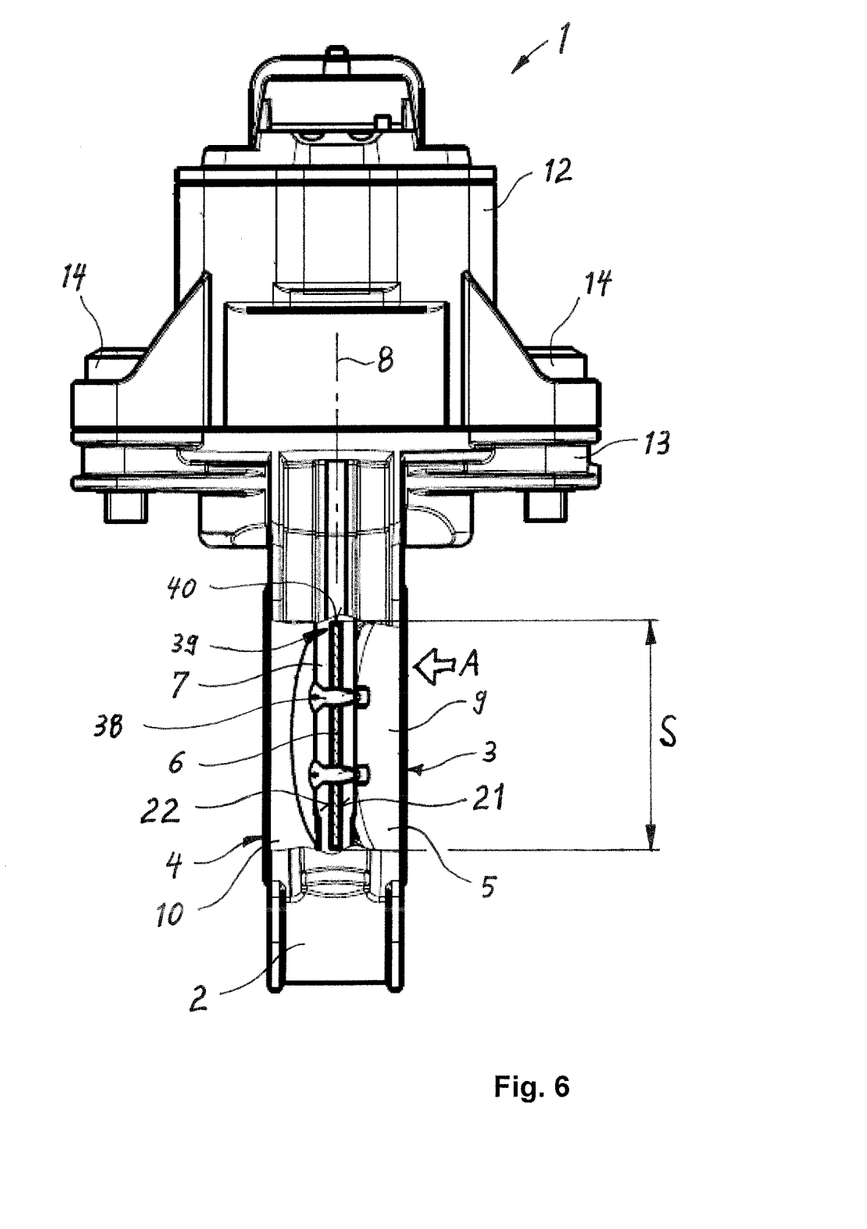
FIG. 6 is a view, partially in section, of another valve according to this disclosure.

In FIGS. 1 and 6 the closure body 6 is illustrated in its closed position. The closure body 6 is oriented transversely to the longitudinal direction 11 of the duct 5 and blocks the duct 5 so that the passage from the inlet opening 3 to the outlet opening 4 is closed.

The valve 1 has an electromagnetic actuating drive 12, connected with the shaft 7, which drive contains in a manner which is not illustrated but is known per se, a magnet rotor, connected in a torque-proof manner with the shaft 7, and a coil body penetrated by the shaft. The housing 2 contains a flange 13 on which the actuating drive 12 is fastened with screws 14. The shaft 7 is supported only on one side of the closure body 6 in the housing, namely via a ball bearing 15. A further bearing, not illustrated, for the shaft 7 can be arranged within the actuating drive 12. No bearing is situated on the side of the closure body 6 lying opposite the ball bearing 15. In the housing 2, in addition, a resetting device 16 is arranged, which pivots the closure body 6 into its closed position when the actuating drive 12 is not activated or fails.

On the inner wall of the duct 5 in the region of the closure body 6, two elongated projections 17 and 18 are arranged, which project into the duct 5 and extend by their longitudinal direction in circumferential direction of the duct 5. The projection 17 is situated in the upstream section 9 of the duct 5 and the projection 18 is situated in the downstream section 10 of the duct 5. The projections 17, 18 therefore lie on opposite sides of the closure body 6. The projection 17 has a valve seat 19, which points in longitudinal direction 11 to the downstream section 10 of the duct 5. The projection 18 has a valve seat 20, which points in longitudinal direction 11 to the upstream section 9 of the duct 5. The closure body 6 has two sides 21, 22 lying opposite one another. Each of the sides 21, 22 contains respectively a sealing surface for abutment on the valve seats 19, 20. In closed position of the closure body 6, the sealing surface 21 lies against the valve seat 19 and the sealing surface 22 lies against the valve seat 20. By pivoting the closure body 6 out from its closed position, the sealing surfaces 21, 22 are raised from their respective valve seat 19, 20.

Figure 3:
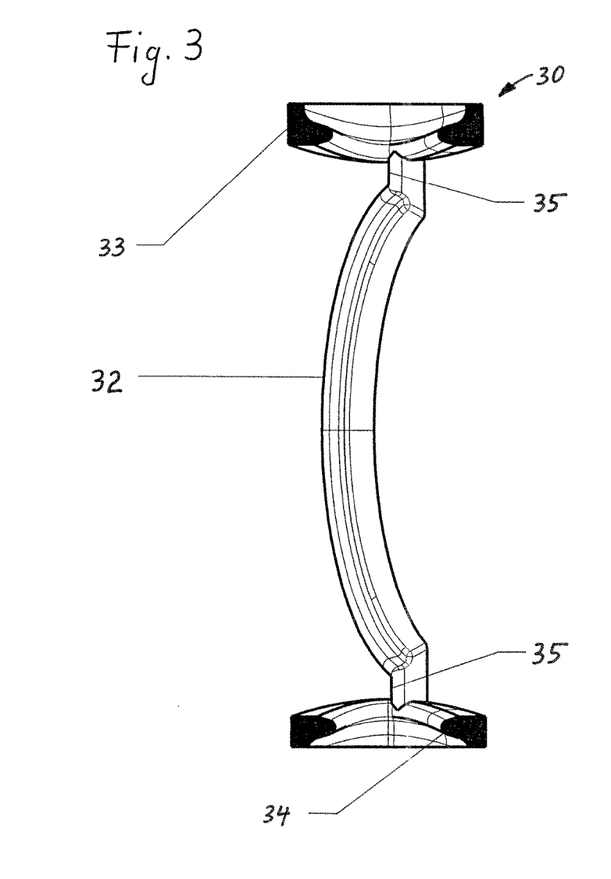
FIG. 3 is an enlarged illustration of the seal of the valve of FIG. 1.
Figure 4:
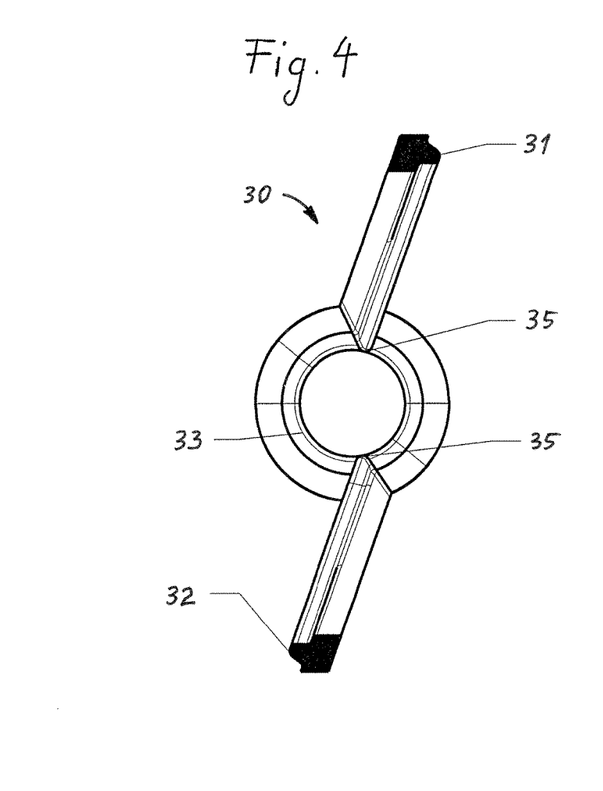
FIG. 4 shows the seal of the valve in a view according to FIG. 2 in an enlarged view.

The valve 1 contains a seal 30, which can be seen in particular in FIGS. 3 and 4. The seal 30 is constructed in one piece, consists of FKM and has a plurality of functional sections 31, 32, 33, 34, 35. The seal 30 could, however, also be configured in several parts, for example by the individual functional sections 31, 32, 33, 34 and/or 35 being embodied as separate seals which lie against one another in a sealing manner. For the sake of simplicity, mention is made below of "seals 31, 32, 33, 34, 35," even if these are preferably connected with one another in one piece.

On the valve seat 19 a seal 31 is arranged, which is fastened to the projection 17 and in the closed position of the closure body 6 is contacted in a sealing manner by the sealing surface 21. A seal 32 is arranged on the valve seat 20 and is fastened on the projection 18. In the closed position of the closure body 6, the seal 32 is contacted in a sealing manner by the sealing surface 22. The projections 17, 18 each have a groove-shaped duct for receiving the seal 31, 32, which duct extends in longitudinal direction of the respective projection 17, 18.

In the region of an edge of the closure body 6 facing the bearing 15, a circular-cylindrical circumferential surface 25 of the shaft 7 is arranged. A circular-cylindrical circumferential surface 26 of the shaft 7 is arranged in the region of an edge of the closure body 6 facing away from the bearing 15. The circular-cylindrical circumferential surfaces 25, 26 are formed by the cylindrical outer contour of the shaft 7. A seal 33 extends in circumferential direction of the circular-cylindrical circumferential surface 25, surrounds the entire circumference of the circular-cylindrical circumferential surface 25 and contacts in a sealing manner the circular-cylindrical circumferential surface 25 along its entire circumference. A seal 34 extends in circumferential direction of the circular-cylindrical circumferential surface 26, surrounds the entire circumference of the circular-cylindrical circumferential surface 26 and contacts in a sealing manner the circular-cylindrical circumferential surface 26 along its entire circumference. The seals 33, 34 are fastened to the wall of the duct 5 and, on pivoting of the closure body 6, slide over their respective circular-cylindrical circumferential surface 25, 26. Even when the seal 33 already seals the bearing 15, in addition a shaft sealing ring 23 can be provided between the seal 33 and the bearing 15 to improve the sealing.

At the transition from the seal 32 to the seal 33 a sealing lip 35 is arranged. The sealing lip 35 extends in axial direction of the circular-cylindrical circumferential surface 25. The sealing lip 35 contacts in a sealing manner the circular-cylindrical circumferential surface 25 and, on pivoting of the closure body 6, slides over the circular-cylindrical circumferential surface 25. In the same manner, a sealing lip 35 is arranged respectively between the seals 32 and 34, 31 and 33 as well as 31 and 34. Through the sealing lips 35, a particularly good sealing of the closure body 6 in its closed position is ensured.

Furthermore, a seal 36 surrounding the inlet opening 3 and a seal 37 surrounding the outlet opening 5 are arranged on the housing 2. The housing 2 is produced as an injection moulded part of PPA GF 50. The seals 30 to 37 are injected onto the housing 2 by the two-component injection moulding process. A further seal (not illustrated) can be mounted on the surface of the flange 13 facing the actuating drive 12. All seals 30 to 37 are connected with one another by connecting ducts running in the housing, which are not illustrated in the figures for reasons of simplification. The connecting ducts can run on or under the surface of the housing and make it possible that the seals 30 to 37 can be injected from one sprue.

As can be seen in FIG. 1, the recess in the shaft 7 contains slots 27, 28, in order to receive the closure body 6. In the region of the circular-cylindrical circumferential surface 25 a slot 27 is arranged, which passes radially through the shaft 7 and in which the closure body 6 is placed. In the region of the circular-cylindrical circumferential surface 26 a slot 28 is arranged, which passes radially through the shaft 7 and in which the closure body 6 is placed. The circular-cylindrical circumferential surfaces 25, 26 adjoin the respective slot 27, 28 and are partially penetrated by it. The closure body 6 is fastened to the shaft 7 by means of screws 38, see FIG. 5. Near the edge of the closure body 6, facing the bearing 15, through the combination of the circular-cylindrical circumferential surface 25, the seal 33, the slot 27 and the two sealing lips 35 lying against the circular-cylindrical circumferential surface 25, a particularly good seal and a very small leakage mass flow is ensured. The same applies in an analogous manner for the combination 26, 34, 28 and 35 near the edge of the closure body 6 facing away from the bearing 15.

On pivoting of the closure body 6 into its closed position, its sealing surfaces 21, 22 firstly touch the seals 31, 32. On further pivoting of the closure body 6, the seals 31, 32 are pressed together elastically. The valve has a single stop 29 for delimiting the pivoting movement of the closure body 6 elastically deforming the seal 30 on reaching its closed position. The stop 29 is arranged on the projection 18, which has the valve seat 20 pointing to the upstream section 9 of the duct 5. The closure body 6 strikes against the stop 29 on reaching its closed position. The closed position is therefore not defined by the seals 31, 32, but rather by the stop 29. The closure body 6 does not touch the projection 17.

Figure 7:
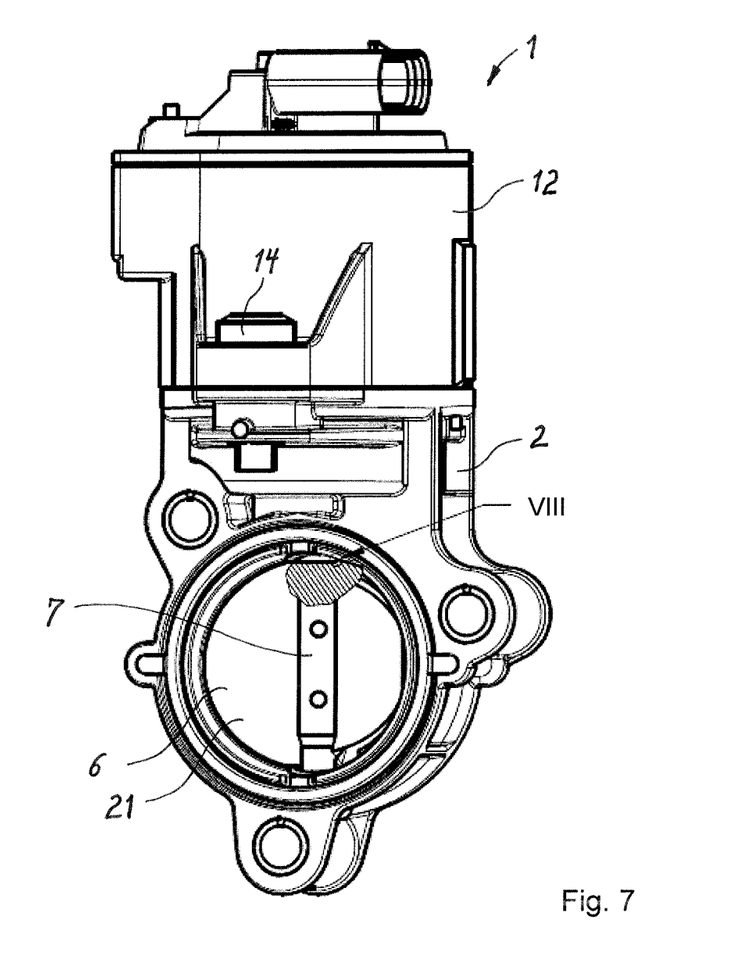
FIG. 7 is a transverse view, partially in section, of the valve of FIG. 6.
Figure 8:
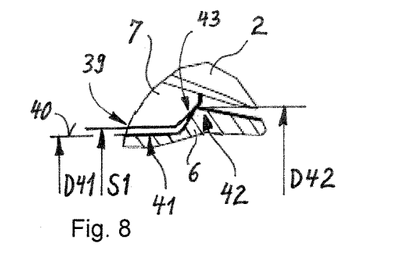
FIG. 8 is an enlarged illustration of the region of the closure body and of the valve shaft designated by the arrow VIII of FIG. 7.

In the embodiment of the valve 1 illustrated in FIGS. 6 and 7, the closure body 6 sits in a recess of the shaft 7 constructed as a continuous slot 39 and is also fastened to the shaft 7 by means of screws 38. With regard to the seal 30, the valve 1 illustrated in FIGS. 6 and 7 can be configured in the same manner as the valve illustrated in FIGS. 1 to 5.

The closure body 6 has respectively a circumferential surface 40, see in particular FIGS. 2, 5 and 6, which is arranged between the two sides 21, 22 of the closure body 6. The circumferential surface 40 has sections 41, 42, see FIGS. 8 to 15, with different external dimensions D41, D42. A first external dimension D41 of the circumferential surface 40 of the closure body 6 in a first section 41 is smaller than the smallest internal dimension S1 between the end regions of the recess of the shaft 7, in which the closure body 6 sits. All dimensions D, S are measured parallel to one another along the rotation axis 8 of the shaft 7. The smallest internal dimension S1 corresponds in the valve 1 according to FIG. 1 to the inside dimension of the recess of the shaft 7, formed by the slots 27 and 28, in axial direction of the shaft 7. In the variant of FIG. 6, the smallest internal dimension S1 corresponds to the inside dimension of the slot 39 in axial direction of the shaft 7.

The closure body 6 has a second section 42, in which a second external dimension D42 of the circumferential surface 40 of the closure body 6 is greater than the smallest internal dimension S1 of the recess of the shaft. Thereby, stop shoulders 43 are formed on the circumferential surface 40 of the closure body 6, which can be seen in particular in the transverse views transversely to the rotation axis 8 of the shaft 7 onto the side 21 of the closure body 6 according to FIGS. 8 to 14. In FIGS. 8 to 15, only a region of the closure body 6 facing the actuating drive 12 is illustrated. The closure body 6 is, however, configured in a mirror-inverted manner with respect to a symmetry plane oriented perpendicularly to the rotation axis 8 in its region facing away from the actuating drive 12. The closure body contour therefore has two stop shoulders 43 on the circumferential surface 40 of the closure body 6. At each of the two end regions of the slot 39 or respectively in the end region of the slot 27 and of the slot 28, one of the two stop shoulders 43 is situated. With its two stop shoulder 43, the circumferential surface 40 of the closure body 6 lies in each of the two end regions of the recess in contact with the shaft 7, wherein the recess of the shaft 7 in FIG. 1 is formed by the slots 27 and 28 and in FIG. 6 by the slot 39.

The section 41 of the circumferential surface 40 having the external dimension D41 extends perpendicularly to the rotation axis 8 of the shaft 7 within the slots 27, 28, 39 up to the opposite side of the shaft 7 lying opposite the section 42 of the circumferential surface 40. On mounting of the closure body 6 in the recess of the shaft 7, the closure body 6 is pushed into the slots 27, 28, 39 transversely to the rotation axis 8, until the stop shoulders 43 strike against the shaft 7. Hereby, the leakage paths running along the circumferential surface 40 of the closure body 6 through the slots 27, 28, 39 are closed, and the tightness of the valves 1 according to this disclosure in closed position is improved.

Between the two sections 41 and 42, the circumferential surface 40 of the closure body 6 in each case of the views of FIGS. 8 to 13 contains a straight line section 44, which has an angle W of a maximum of 45° to the rotation axis 8 of the shaft 7. When the stop shoulders 43 are formed by curved sections of the circumferential surface 40, then alternatively to the straight line section 44 the circumferential surface 40 can define a tangent, running in the plane of the drawing of FIGS. 8 to 14, which has an angle of a maximum of 45° to the rotation axis 8 of the shaft 7. Through the angle W of the straight line section 44 or of the corresponding tangent, on mounting of the closure body 6 in the shaft 7, in particular in the embodiments according to FIGS. 11 and 13, it is ensured that the actual position of the closure body 6 occurring in the shaft 7—owing to manufacturing tolerances on the closure body 6 and on the shaft 7—does not deviate in an unacceptable manner from its desired target position.

Figure 9:
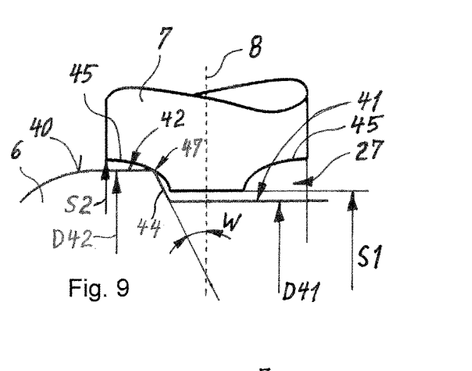
FIG. 9 is a diagrammatic illustration of a portion of the closure body and of the valve shaft along the section plane IX-IX of FIG. 2 or respectively similar to FIG. 8.
Figure 10:
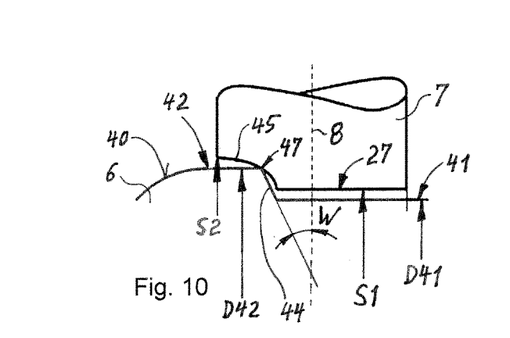
FIGS. 10 to 13 are illustrations of different embodiments in accordance with FIG. 9.
Figure 11:
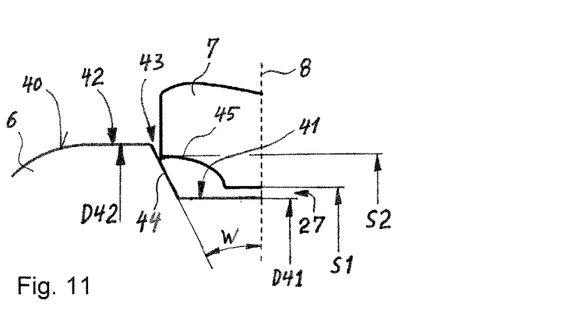
Figure 12:
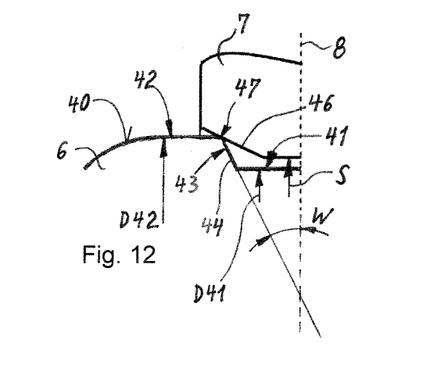
Figure 13:
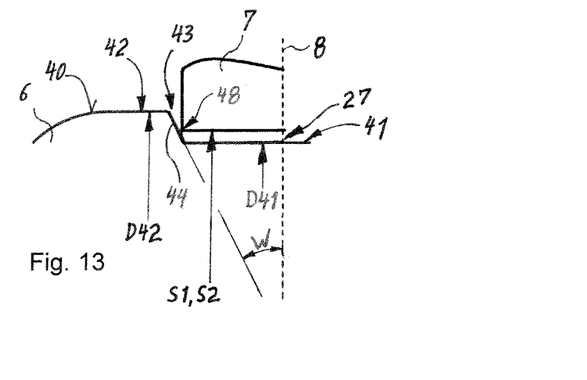
Figures 14, 15:
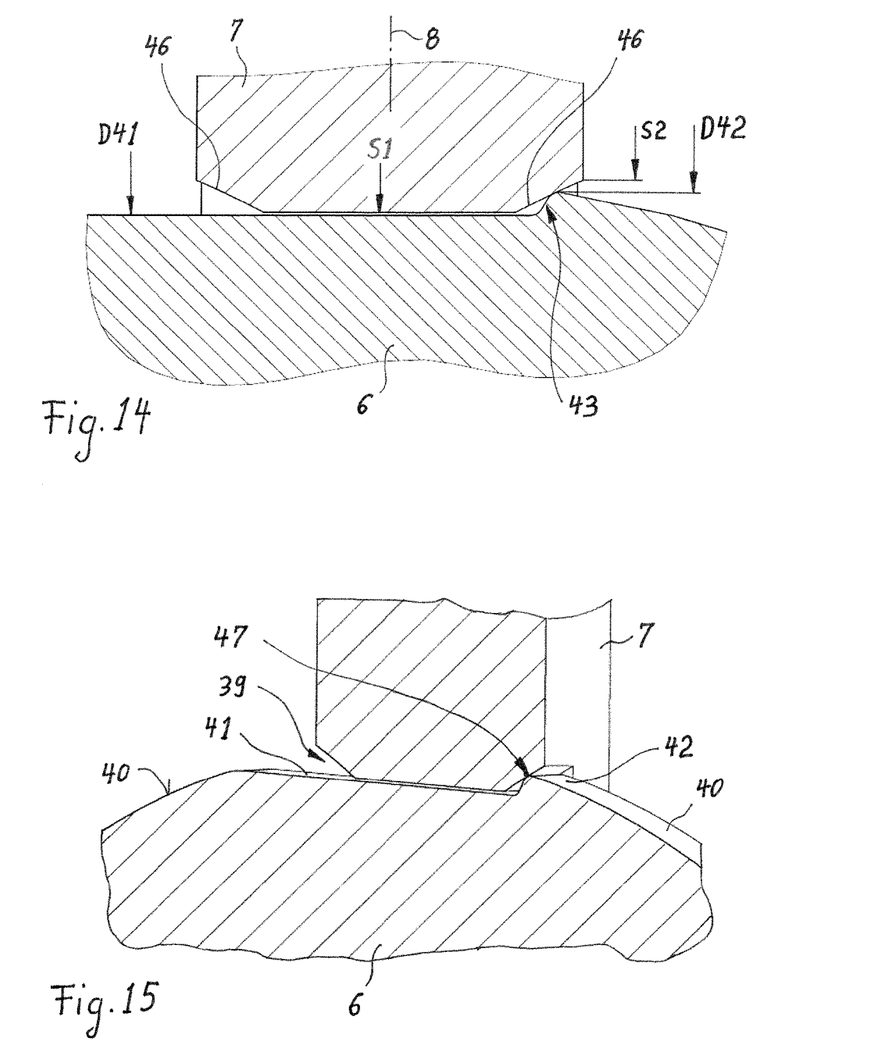
FIG. 14 is a further enlarged illustration of a portion of the closure body and of the valve shaft similar to FIG. 8.
FIG. 15 is a perspective illustration of the embodiment of FIG. 14.

As can be seen in FIGS. 8 to 15, the type of abutment of the circumferential surface 40 of the closure body 6 against the shaft 7 can be ensured in various ways, depending on how the end regions of the recess 27, 28 or respectively 39 are configured in the shaft 7. In the cases of FIGS. 9 to 11, the end region of the recess of the shaft 7 contains for example a rounding 45. The stop shoulder 43 can lie with its corner point in the region of the rounding 45 against the shaft 7, see FIGS. 9 and 10. In FIGS. 8, 12, 14 and 15, a chamfer 46 is arranged in the end region of the recess of the shaft 7, which chamfer 46 contacts the stop shoulder 43. In all these embodiments, the contact between the circumferential surface 40 and the shaft 7 is formed by a line contact 47 lying within the recess of the shaft 7, because in each case the external dimension D42 is smaller than an internal dimension S2 of the recess at the transition of the rounding 45 or of the chamfer 46 to the circumferential surface of the shaft 7 on the side facing the section 42. The line contact 47 runs in a straight line, see in particular FIG. 15. In the embodiment of FIGS. 14 and 15, the section of the stop shoulder 43 touching the chamfer 46 is rounded, for example by a radius of 0.2 mm. This is able to be produced in a simple manner and ensures a very good sealing. The recess 27 or respectively 39 in the shaft 7 can be constructed symmetrically to the rotation axis 8, as is indicated by way of example in FIGS. 9 and 14, by a rounding 45 or respectively a chamfer 46 being provided respectively on both sides of the shaft 7. The closure body 6 can then be pushed into the shaft 7 from both sides during assembly. However, an unsymmetrical configuration is also sufficient for a good sealing, as is indicated by way of example in FIG. 10, by a rounding 45 or a chamfer 46 being provided only on the side of the shaft 7 facing the stop shoulder 43. This embodiment is able to be produced with less effort.

The stop shoulder 43 can, however, also be so large that it projects over a rounding 45 in the end region of the recess of the shaft 7, see FIG. 11. In FIG. 13, the end region of the recess of the shaft 7 is constructed in a sharp-edged manner and lies with its edge 48 against the straight line section 44 of the stop shoulder 43. In the embodiments of FIGS. 11 and 13, the contact between the circumferential surface 40 and the shaft 7 lies outside the recess of the shaft 7, because in each case the external dimension D42 is greater than the internal dimension S2. The difference of the external dimension D42 from the internal dimension S2 is in particular somewhat greater here than the difference of the external dimension D41 from the internal dimension S1, in order to ensure a reliable sealing.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS

| | |
|---|---|
| 1 | valve |
| 2 | housing |
| 3 | inlet opening |
| 4 | outlet opening |
| 5 | duct |
| 6 | closure body |
| 7 | shaft |
| 8 | rotation axis |
| 9 | upstream section |
| 10 | downstream section |
| 11 | longitudinal direction |
| 12 | actuating drive |
| 13 | flange |
| 14 | screws |
| 15 | ball bearing |
| 16 | resetting device |
| 17 | projection |
| 18 | projection |
| 19 | valve seat |
| 20 | valve seat |
| 21 | sealing surface |
| 22 | sealing surface |
| 23 | shaft sealing ring |
| 25 | circumferential surface of the shaft 7 |
| 26 | circumferential surface of the shaft 7 |
| 27 | slot |
| 28 | slot |
| 29 | stop |
| 30 | seal |
| 31 | seal |
| 32 | seal |
| 33 | seal |
| 34 | seal |
| 35 | sealing lips |
| 36 | seal |
| 37 | seal |
| 38 | screws |
| 39 | slot |
| 40 | circumferential surface of the closure body 6 |
| 41 | first section |
| 42 | second section |
| 43 | stop shoulder |
| 44 | straight line section |
| 45 | rounding |
| 46 | chamfer |
| 47 | line contact |
| 48 | edge |
| A | flow direction |
| D | external dimensions of the closure body 6 |
| S | internal dimensions of the recess |
| W | angle |

What is claimed is:

1. A valve for an exhaust gas line of an internal combustion engine, comprising:
 a housing with an inlet opening and an outlet opening and a duct for directing exhaust gases from the inlet opening to the outlet opening;
 a closure body arranged in the duct and positioned in a torque-proof manner in a recess of a shaft, the closure body being pivotable about a rotation axis of the shaft and having a closed position in which the closure body separates upstream and downstream sections of the duct;
 the closure body having first and second sides, wherein in the closed position of the closure body the first side faces the upstream section of the duct and the second side faces the downstream section of the duct;
 the closure body having a circumferential surface arranged between the first and second sides, the circumferential surface having sections with different external dimensions;
 a first external dimension of the circumferential surface in a first section being smaller than the smallest internal dimension between two end regions of the recess, wherein all said dimensions are measured parallel to one another along the rotation axis of the shaft;
 a second external dimension of the circumferential surface in a second section being greater than the smallest internal dimension between the two end regions; and
 the circumferential surface contacting the shaft in each of the two end regions of the recess.

2. The valve according to claim 1, wherein the contact between the circumferential surface of the closure body and the shaft is formed by a line contact lying within the recess of the shaft.

3. The valve according to claim 2, wherein the line contact forms a straight line.

4. The valve according to claim 1, wherein the circumferential surface of the closure body has at least one stop shoulder, which in one of the two end regions of the recess lies against the shaft.

5. The valve according to claim 1, wherein the circumferential surface of the closure body has two stop shoulders, each of which lies against the shaft in one of the two end regions of the recess.

6. The valve according to claim 1, further comprising:
 two projections arranged on an inner wall of the duct in a region of the closure body, the projections extending in a circumferential direction of the duct, one of the projections being situated in an upstream section of the duct and the other projection being situated in a downstream section of the duct;
 each of the projections having a valve seat pointing in the longitudinal direction of the duct, the two valve seats pointing in opposite directions; and
 the closure body having two sealing surfaces arranged on opposite sides thereof, wherein each sealing surface in the closed position of the closure body lies against one of the valve seats and, by pivoting the closure body from its closed position, the sealing surfaces are raised from their respective valve seats.

7. The valve according to claim 6, further comprising:
 a polymer seal arranged on the valve seats, wherein in the closed position of the closure body, the polymer seal is contacted in a sealing manner by the associated sealing surface of the closure body;
 a cylindrical surface formed on the shaft in the end regions; and
 the polymer seal contacting in a sealing manner at least a region of the cylindrical surface facing the upstream section of the duct.

8. The valve according to claim 7, wherein the polymer seal surrounds and seals the entire circumference of the shaft.

9. The valve according to claim 6, wherein the seal has a sealing lip extending in an axial direction of the shaft, the sealing lip contacting in a sealing manner the cylindrical surface of the shaft and on pivoting of the closure body slides over the shaft.

10. The valve according to claim 1, wherein the recess of the shaft has at least one slot passing radially through the shaft in which the closure body is placed.

* * * * *